(12) United States Patent
Chen et al.

(10) Patent No.: US 10,991,124 B2
(45) Date of Patent: Apr. 27, 2021

(54) DETERMINATION APPARATUS AND METHOD FOR GAZE ANGLE

(71) Applicant: Institute For Information Industry, Taipei (TW)

(72) Inventors: Hung-En Chen, Taipei (TW); Wei-Yu Cho, Taipei (TW); Jing-Ming Chiu, Taipei (TW); Yu-Ling Hsu, Taipei (TW); Hsiao-Chen Chang, Taipei (TW)

(73) Assignee: Institute For Information Industry, Taipei (TW)

( * ) Notice: Subject to any disclaimer, the term of this patent is extended or adjusted under 35 U.S.C. 154(b) by 19 days.

(21) Appl. No.: 16/721,354

(22) Filed: Dec. 19, 2019

(65) Prior Publication Data

US 2020/0242800 A1 Jul. 30, 2020

(30) Foreign Application Priority Data

Jan. 29, 2019 (TW) .................................. 108103319

(51) Int. Cl.
*G06T 3/40* (2006.01)
*G06T 7/73* (2017.01)
*G06K 9/00* (2006.01)

(52) U.S. Cl.
CPC ............ *G06T 7/74* (2017.01); *G06K 9/00228* (2013.01); *G06K 9/00281* (2013.01); *G06T 2207/20081* (2013.01); *G06T 2207/30201* (2013.01)

(58) Field of Classification Search
CPC .......... G06K 9/00248; G06K 9/00281; G06K 9/0061; G06K 9/00255; G06K 9/00597;
(Continued)

(56) References Cited

U.S. PATENT DOCUMENTS

| 2014/0243971 A1 | 8/2014 | Pugh et al. |
| 2015/0135309 A1* | 5/2015 | Karmarkar ......... G06K 9/00617 726/19 |

(Continued)

FOREIGN PATENT DOCUMENTS

| CN | 105425967 A | 3/2016 |
| CN | 108446943 A | 8/2018 |

(Continued)

*Primary Examiner* — Quan M Hua
(74) *Attorney, Agent, or Firm* — Skaar Ulbrich Macari, P.A.

(57) ABSTRACT

A determination apparatus and method for gaze angle are provided. The apparatus analyzes an image to generate a plurality of facial triaxial positioning values and a plurality of facial landmark points. The apparatus obtains a plurality of specific facial landmark points from the facial landmark points to generate a heatmap, and compares the heatmap with a standard heatmap to generate an image compensation value. The apparatus performs a facial correcting process based on the image and the image compensation value to generate a virtual corrected image. The apparatus analyzes the virtual corrected image to obtain a displacement of pupil. The apparatus determines a gaze angle of a user according to a determination model for gaze angle, the facial triaxial positioning values and the displacement of pupil.

18 Claims, 5 Drawing Sheets

(58) Field of Classification Search
CPC .......... G06K 9/00671; G06K 9/00268; G06K 9/00617; G06K 9/00335; G06K 9/4671; G06K 9/6256; G06K 9/6273; G06K 9/00221; G06K 2009/4666; G06K 9/00302; G06K 9/00234; G06K 9/00308; G06K 9/00845; G06K 9/00201; G06K 2009/00939; G06T 2207/30201; G06T 7/73; G06T 7/246; G06T 13/40; G06T 2207/20084; G06T 2207/20081; G06T 2219/2021; G06T 7/13; G06T 7/11; G06T 2207/10048

See application file for complete search history.

(56) References Cited

U.S. PATENT DOCUMENTS

| | | | |
|---|---|---|---|
| 2019/0110003 A1 | 4/2019 | Lai et al. | |
| 2019/0246036 A1* | 8/2019 | Wu | H04N 5/23216 |
| 2019/0271644 A1* | 9/2019 | Suzuki | G01N 21/64 |
| 2020/0160615 A1* | 5/2020 | Jang | G06T 19/20 |

FOREIGN PATENT DOCUMENTS

| | | |
|---|---|---|
| EP | 2814252 A2 | 12/2014 |
| TW | 201805856 A | 2/2018 |
| TW | M569008 U | 10/2018 |

* cited by examiner

DETERMINATION APPARATUS AND METHOD FOR GAZE ANGLE

PRIORITY

This application claims priority to Taiwan Patent Application No. 108103319 filed on Jan. 29, 2019, which is hereby incorporated by reference in its entirety.

FIELD

The present invention relates to a determination apparatus and method for gaze angle. More particularly, the present invention relates to an apparatus and method for determining a gaze angle of a user by recognizing an image.

BACKGROUND

Due to the rapid development of technology, image processing technology has been utilized in various camera devices (e.g., the camera device which is used to monitor factory operators that operate the control panel, general monitor devices disposed around the store shelves) so as to provide a variety of related information, services, promotions, or assistances, such as the related information about the control buttons that the factory operator is looking at and the related information about the products on the shelves that the customer is looking at, to a target user according to the gaze of the target user.

There are two main types of gaze tracking technologies in the prior art. The first type is that the user needs to wear special glasses, the special glasses have sensors that can detect and track the movement of the user's pupils and thus to determine the user's gaze target by combining the sensors with other senses or locators of the mall. However, since the user is required to wear extra hardware and set up additional sensors, it is not convenient in use and will increase the cost of installation. The first type therefore cannot be effectively applied in a general factory or a store.

A second type of gaze tracking technology mainly captures a user's facial image, analyzes the image to obtain an eye position, and further obtains a pupil position, and then tracks the displacement and the direction of the pupil at different time points to determine the user's gaze. However, this type of technology requires precise positioning of the pupil in advance, so that the displacement and the direction of the pupil can be correctly tracked to determine the user's gaze, and the image must have enough clarity to improve the accuracy of the determination.

Since the distance for capturing the image cannot be too far, the camera is usually installed on the computer screen to capture the image. When performing the gaze tracking technology, the user needs to perform a complicated positioning process through a user interface, and positions his face and the facial features in the preset area of the user interface to process a positioning and a correction detection (e.g., the size of the preset facial features must be met within a certain focal length), such a process is time-consuming and inconvenient to use.

In addition, the conventional technology only considers the frontal face of the user when the image analysis is performed to obtain the face image (i.e., with a presumption that the angle of the face is fixed). Since the conventional technology does not consider the angles of the skewing of the user's face, the rotating of the user's face, and the lateral user's face, the result may cause significant inaccuracies. Due to the needs for clear facial images, such technologies are limited to the detection for close distances (e.g., the distance between the user and the camera is between 30 and 45 cm), so it still cannot effectively be used in shopping malls, factories or other environment.

Accordingly, there is an urgent need in the art for useful invention to efficiently and accurately determine the gaze angle of a person without adding additional hardware installation costs and processing the complicated pupil positioning process.

SUMMARY

Provided is a determination apparatus for gaze angle. The determination apparatus can comprise a storage, an image capturing device, and a processor, and the processor is electrically connected to the storage and the image capture device. The storage stores a determination model for gaze angle. The image capturing device is configured to capture an image. The processor analyzes the image to generate a plurality of facial triaxial positioning values and a plurality of facial landmark points. The processor obtains a plurality of specific facial landmark points from the facial landmark points to generate a heatmap, and compares the heatmap with a standard heatmap to generate an image compensation value, the image compensation value indicates a displacement of facial landmark. The processor performs a facial correcting process based on the image and the image compensation value to generate a virtual corrected image. The processor analyzes the virtual corrected image to obtain a displacement of pupil. The processor determines a gaze angle of a user according to the determination model for gaze angle, the facial triaxial positioning values, and the displacement of pupil.

Also provided is a determination method for gaze angle adapted for a determination apparatus for gaze angle. The determination apparatus may comprise a storage, an image capturing device, and a processor. The storage stores a determination model for gaze angle. The image capturing device is configured to capture an image. The determination method for gaze angle is performed by the processor and comprises the following steps: (a) analyzing the image to generate a plurality of facial triaxial positioning values and a plurality of facial landmark points, (b) obtaining a plurality of specific facial landmark points from the facial landmark points to generate a heatmap, and comparing the heatmap with a standard heatmap to generate an image compensation value, the image compensation value indicates a displacement of facial landmark, (c) performing a facial correcting process based on the image and the image compensation value to generate a virtual corrected image, (d) analyzing the virtual corrected image to obtain a displacement of pupil, and (e) determining a gaze angle of a user according to the determination model for gaze angle, the facial triaxial positioning values, and the displacement of pupil.

The determination technology for gaze angle (including at least the apparatus and method) analyzes the facial features and the facial angle of the image, and then generates a plurality of facial triaxial positioning values and a plurality of face landmark points respectively. The determination technology for gaze angle then generates an image compensation value by comparing the heatmap generated by the facial feature points with the standard heatmap, and generates the virtual corrected facial image based on the image and image compensation values. The determination technology for gaze angle analyzes the virtual corrected facial image to obtain a displacement of pupil. The determination technology for gaze angle inputs the facial triaxial positioning values and the displacement of pupil to the determination model for gaze angle, and determines the gaze angle of the user in the image. Through the aforesaid operations, the present invention can determine the gaze angle of the user through the image without the complicated pupil positioning, and effectively save the additional hardware installation cost, and solve the problems that may occur in the prior art. In addition, the facial image is corrected before determining the gaze angle, so that it can be applied to various facial angle images of the user, and can be applied in fields such as shopping malls and factories, and more accurately determine the gaze angle of the user. The detailed technology and preferred embodiments implemented for the subject invention are described in the following paragraphs accompanying the appended drawings for people skilled in this field to well appreciate the features of the claimed invention.

DETAILED DESCRIPTION

In the following description, a determination apparatus and method for gaze angle according to the present invention will be explained with reference to certain example embodiments thereof. However, these example embodiments are not intended to limit the present invention to any specific example, embodiment, environment, applications, or implementations described in these example embodiments. Therefore, description of these example embodiments is only for purpose of illustration rather than to limit the present invention.

It shall be appreciated that, in the following embodiments and the attached drawings, elements unrelated to the present invention are omitted from depiction. In addition, dimensions of individual elements and dimensional relationships among individual elements in the attached drawings are provided only for illustration but not to limit the scope of the present invention.

Figure 1A:
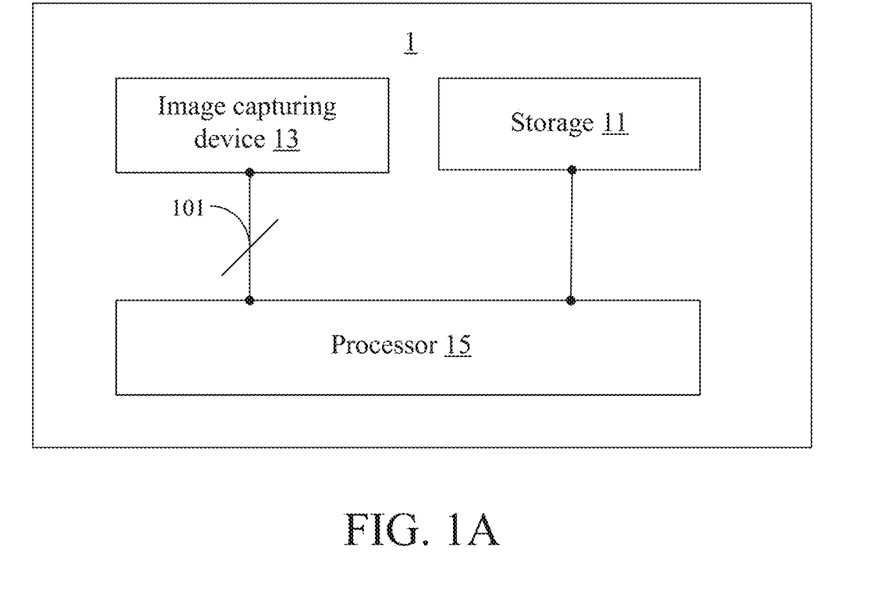
FIG. 1A illustrates a schematic view of the determination apparatus 1 for gaze angle of the first embodiment.

A first embodiment of the present invention is a determination apparatus 1 for gaze angle and a schematic view of which is depicted in FIG. 1A. The determination apparatus 1 comprises a storage 11, an image capturing device 13, and a processor 15, wherein the processor 15 is electrically connected to the storage 11 and the image capturing device 13. In the embodiment, the storage 11 stores a determination model for gaze angle, the determination model for gaze angle can be established by the determination apparatus 1 itself, or can be received from an external device, and the steps of establishing the determination model for gaze angle and its content will be further described in the following paragraphs. The storage 11 may be a memory, a Universal Serial Bus (USB) disk, a hard disk, a Compact Disk (CD), a mobile disk, or any other storage medium or circuit known to those of ordinary skill in the art and having the same functionality.

The image capturing device 13 is configured to capture an image. In some embodiments, the image capturing device 13 can also capture images from a film captured by a monitoring device or a camera/photographing device (not shown) or directly receive images from the outside device. The image capturing device 13 may be any kinds of charge-coupled devices (CCDs), complementary metal-oxide-semiconductor (CMOS) photosensitive devices, or other image sensing apparatuses capable of capturing images known to those of ordinary skill in the art. The processor 15 may be any of various processors, Central Processing Units (CPUs), microprocessors, digital signal processors or other computing devices known to those of ordinary skill in the art. In some embodiments, the determination apparatus 1 may be integrated into a composite device with a monitoring device, a video recorder, or an information gathering device of the identification system, etc., or the determination apparatus 1 may be a separate device and being coupled with other devices.

In the present embodiment, the processor 15 receives the image 101 from the image capturing device 13. The image 101 may include a facial image of a user (e.g., a person to be detected). For example, the image 101 may be related to a photograph that the factory operator operates the control panel, or be related to a photograph that the customer stands before the shelves and looks at the goods on the shelves, etc.

Next, the processor 15 analyzes the image 101 to generate a plurality of facial triaxial positioning values and a plurality of facial landmark points. The facial triaxial positioning values are used to represent the facial angle of the person in the image. In some embodiments, the facial triaxial positioning values include a yaw, a pitch, and a roll, and each of the yaw, the pitch, and the roll corresponds to a value, and the facial landmark points are used to mark a plurality of facial feature positions of the person in the image. In some embodiments, the facial triaxial positioning values and the facial landmark points are not limited to being generated simultaneously.

Figure 1B:
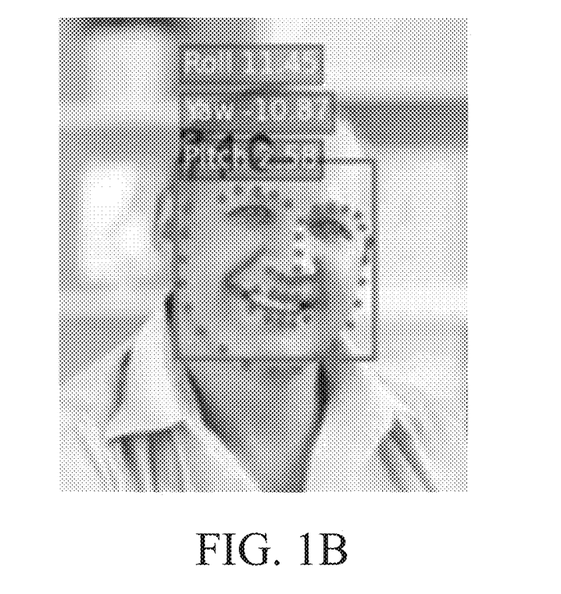
FIG. 1B illustrates a schematic diagram of the facial triaxial positioning values and the facial landmark points.

For example, as illustrated in FIG. 1B, the facial triaxial positioning values generated after analyzing the image are respectively a roll of 11.45, a yaw of −10.87, and a pitch of 2.58. The facial landmark points can mark the facial features positions in the image such as a shape of a face, an eye region (including pupil, the corner of the eye, the contour of the eye, eyebrows, etc.), a nose region, and a mouth (including the contour of the mouth, the left and right ends of the mouth, etc.). It shall be appreciated that that FIG. 1B is only for convenience of illustration, the present invention does not limit the numbers of feature positions of the facial landmark points, and the facial landmark points may also include other facial feature positions that can help the face recognition. The processor 15 can analyze the image 101 by any conventional face recognition technology (e.g., Google Facenet, etc.) to generate facial triaxial positioning values and facial landmark points, and those having ordinary knowledge in the field shall appreciate the detail of generating the facial landmark points according to the above content, and thus will not be further described herein.

It shall be appreciated that due to the cost of installation, the cameras or monitoring devices in the general store/factory are impossible being installed intensively without any limitation, but mainly via an appropriate amount of cameras or monitoring devices to shoot a specific shelf or a control panel. Therefore, when the image 101 is shot/captured, the target person is in a state of freely moving or randomly turning his/her face, and it is most likely that the image of the target person is not shot in a frontal face state (e.g., the image shot by a store camera, showing that the customer stands before the shelves and looks at the goods on the right shelf). Therefore, in order to make the determination of the gaze angle more accurate, in the present embodiment, the processor 15 further corrects the image 101 first by simulating the frontal face, and then performs the subsequent determination of the gaze angle. The operation of generating a virtual corrected image will be described in the following paragraphs.

Specifically, after generating the facial landmark points, the processor 15 obtains a plurality of specific facial landmark points from the facial landmark points to generate a heatmap, and the heatmap is generated based on the facial landmark points. Next, the processor 15 compares the heatmap generated by the image 101 with a standard heatmap to generate an image compensation value, the image compensation value is used to indicate the amount of displacement of turning the lateral face in the image to the frontal face (i.e., the displacement of facial landmark). More specifically, the processor 15 compares the facial landmark points in the heatmap of the image 101 with the facial landmark points in the standard heatmap to obtain the displacement of facial landmark (i.e., the amount of displacement of turning the lateral face to the frontal face). The displacement of facial landmark is then used as an image compensation value for the value of the face displacement.

Figure 2A:
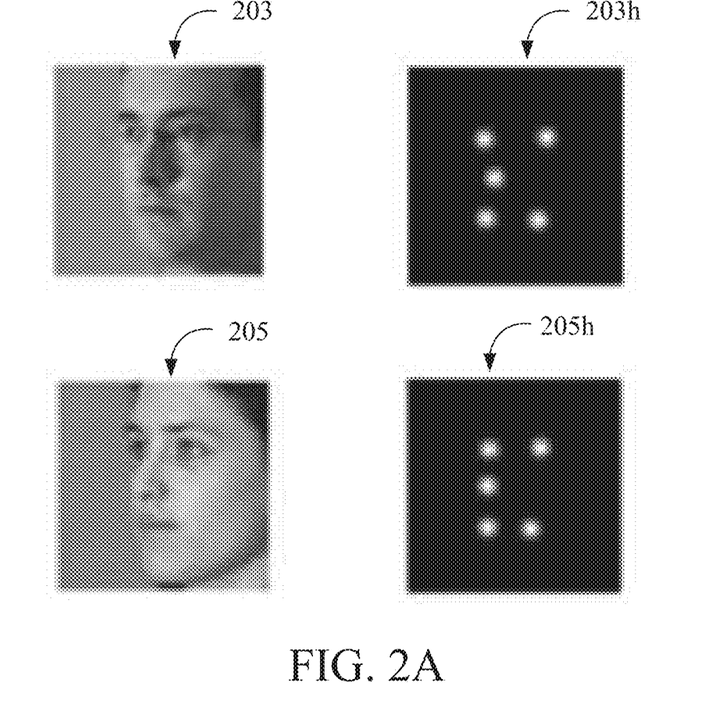
FIG. 2A illustrates a schematic diagram of the image 203 and the image 205 and the corresponding heatmap 203$h$ and heatmap 205$h$.
Figure 2B:
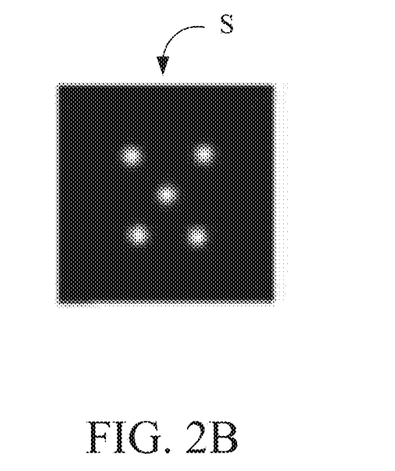
FIG. 2B illustrates a schematic diagram of the standard heatmap S.

For example, as shown in FIGS. 2A and 2B, the image 203 and the image 205 are showing the different two people with different facial angles, and the processor 15 obtains five facial feature positions as the specific facial landmark points from the facial landmark points of each of the images, which are a corner of the left eye, a corner of the right eye (i.e., the corner position of the two eyes), a nasal tip, a left end of the mouth, and a right end of the mouth (i.e., the position of the left end and the right end of the mouth). The processor 15 then generates the heatmap 203*h* (corresponding to the image 203) and the heatmap 205*h* (corresponding to the image 205) showing on the right part of FIG. 2A according to the specific facial landmark points of the two images. Next, the processor 15 compares the heatmap 203*h* with the standard heatmap S showing in FIG. 2B to generate an image compensation value of the image 203. Similarly, the processor 15 compares heatmap 205*h* with the standard heatmap S shown in FIG. 2B to generate an image compensation value of image 205.

Specifically, the processor 15 can calculate the amount of displacement of turning the face to the front as the image compensation value for the image by calculating the distances of moving each specific facial landmark points on the heatmap to each relative position of the standard heatmap S. It shall be appreciated that the processor 15 may generate a standard heatmap S as a comparison standard according to a frontal face image or a plurality of frontal face images by statistics (e.g., averages the coordinates of the specific facial landmark points).

Next, the processor 15 performs a facial correcting process based on the image 101 and the image compensation value to generate a virtual corrected image. Specifically, the facial correcting process is performing a face frontalization process. For example, the processor 15 compares the heatmap 203*h* with the standard heatmap S showing in FIG. 2B, and generates an image compensation value of the image 203, and then turning the face to the front by calculating the distances of moving each specific facial landmark points on the heatmap to each relative position of the standard heatmap S.

Figure 3:
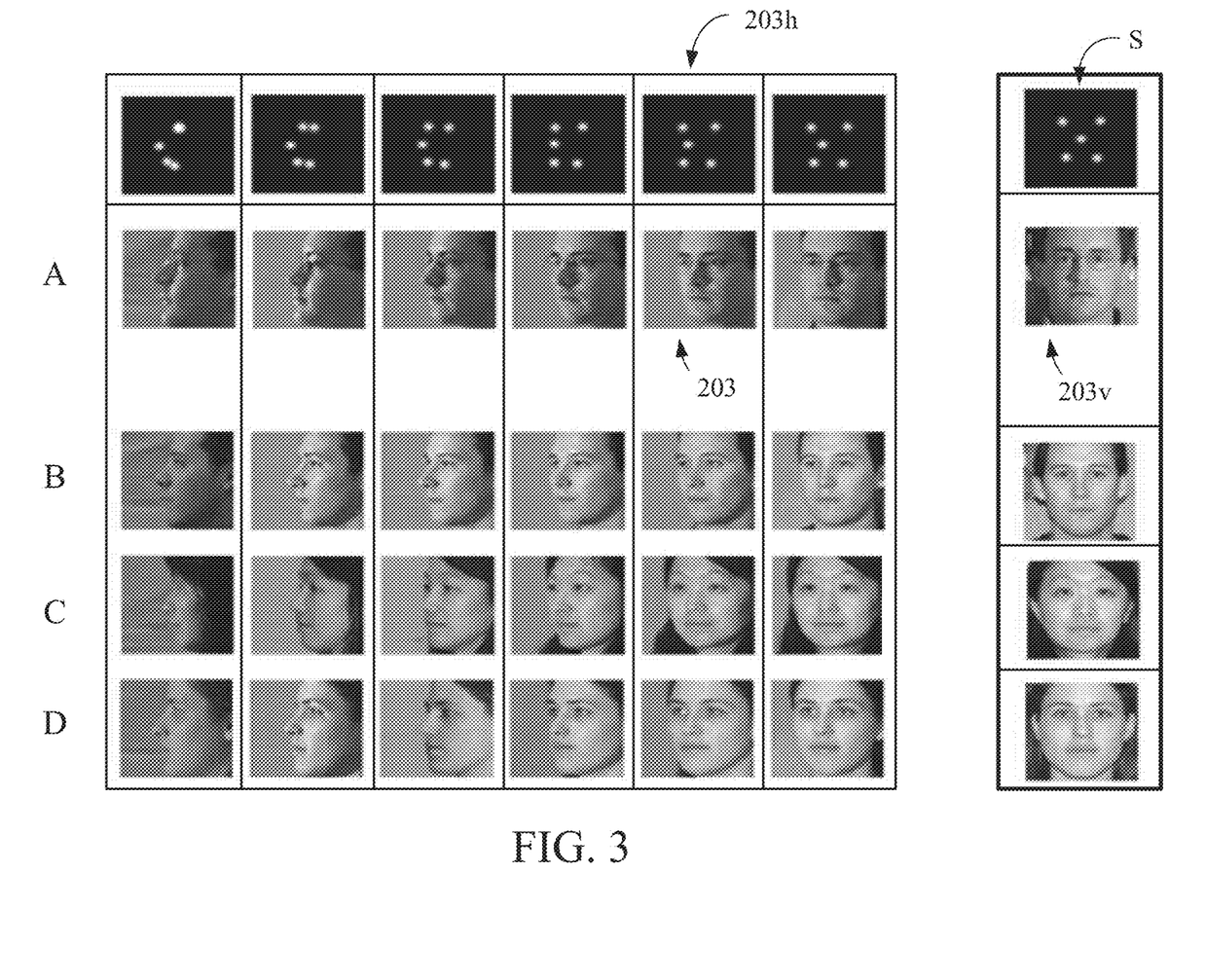
FIG. 3 illustrates a specific example of generating the virtual corrected image 203$v$.

Referring to a practical example as shown in FIG. 3, it shows images of six different skew angles of the persons A, B, C, and D and corresponding heatmaps when facing the camera (for convenience of explanation, this example adopts left to right are skew angles of 90 degrees, 75 degrees, 60 degrees, 45 degrees, 30 degrees, and 15 degrees, respectively, but the actual use may select more various angles). For example, when the processor 15 receives the image 203 of the person A, same as the foregoing example, the processor 15 generates a heatmap 203*h* based on the specific facial landmark points of the image 203. Next, the processor 15 compares the heatmap 203*h* with the standard heatmap S (i.e., the image compensation value is 0) to generate an image compensation value of the image 203. Then, the processor 15 can simulate the frontalization image (i.e. the frontal facial image) of the image 203 according to the image compensation values of the image 203 and the image 203, and generate a virtual corrected image 203*v*. It shall be appreciated that the aforesaid example is only for purpose of illustration rather than to limit the present invention.

In some embodiments, the processor 15 may perform a couple-agent discriminator process after performing the facial frontalization process to enhance simulation accuracy of the virtual corrected image. For example, the processor 15 determines the virtual corrected image generated after the facial frontalization process. If the partial value of the virtual corrected image reaches a certain level (e.g., the width of the mouth is less than a preset value, the distance between each facial organ is too close, the asymmetry is skewed, etc.), the couple-agent discriminator process can be used to correct, so that the virtual corrected image becomes more natural and real. It shall be appreciated that the processor 15 can use the Generative Adversarial Network (GAN) to complete the couple-agent discriminator process, and those having ordinary knowledge in the field shall appreciate the detail according to the above content, and thus will not be further described herein.

Next, the processor 15 analyzes the virtual corrected image to obtain a displacement of pupil. Specifically, the operation of analyzing the virtual corrected image comprises the following operations. First, the processor 15 analyzes the virtual corrected image to generate a plurality of facial landmark points (e.g., Google Facenet, etc.). It shall be appreciated that those having ordinary knowledge in the art should understand the content of analyzing the virtual corrected image to generate a plurality of facial landmark points, and thus will not be further described herein.

The facial landmark points mark at least the feature positions of one eye (including pupil, the corner of the eye, the contour of the eye, etc.) in the virtual corrected image. Next, the processor 15 selects a plurality of eye contour feature points according to the facial landmark points, and extracts a pupil feature point from the eye contour feature points (e.g., the Cascaded Convolutional Neural Networks technique, Tobii Eye Tracker, etc.). Then, the processor 15 obtains the displacement of pupil based on the pupil feature point.

Figure 4:
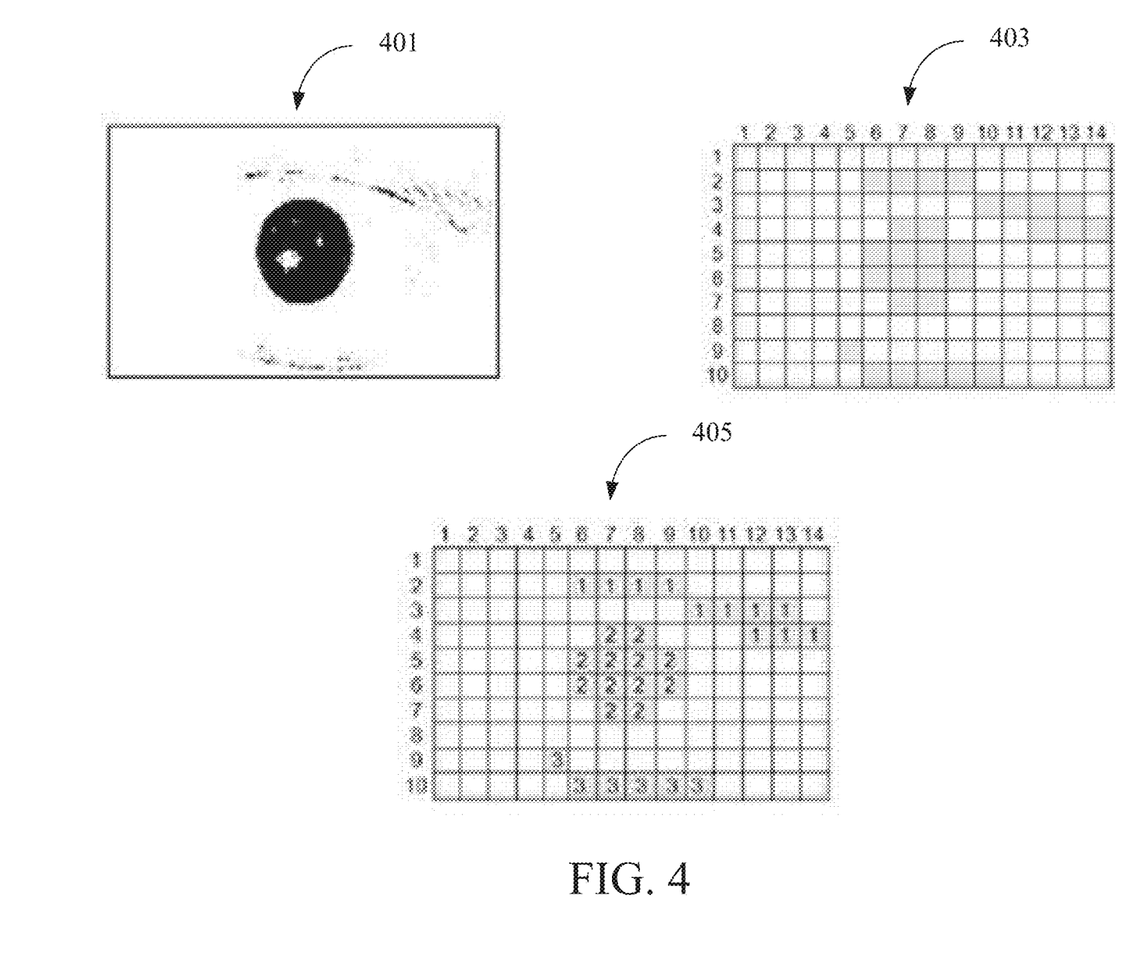
FIG. 4 illustrates a schematic diagram of analyzing the virtual corrected image to obtain the displacement of pupil.

For example, as shown in FIG. 4, the facial landmark points mark the feature positions of the eyes in the virtual corrected image (image 401), and the processor 15 selects a plurality of eye contour feature points according to the facial landmark points (image 403). Next, a pupil analysis training is performed to capture a pupil feature point with the contour features of the eye. Next, the processor 15 performs a pupil analysis training to extract a pupil feature point from the eye contour feature points. Finally, the processor 15 calculates a displacement of pupil based on the pupil feature points. Specifically, the processor 15 can binarize the pupil image (i.e., the eye contour feature points), combine the Convolutional Neural Network (CNN) to identify a plurality of eye contour feature points and divide the eye contour feature points into at least three types (as shown in image 405, wherein the number 1 is the upper eyelid portion, the number 2 is the pupil portion, and the number 3 is the lower eyelid portion), and extract a pupil feature point from the eye contour feature points. It shall be appreciated that those having ordinary knowledge in the art should understand the content of extracting the pupil feature point from the feature points and calculating the displacement of pupil based on the pupil feature point, and thus will not be further described herein.

Next, the processor 15 determines the gaze angle of the user according to the determination model for gaze angle stored in the storage 11, the facial triaxial positioning values, and the displacement of pupil. Specifically, the processor 15 inputs the facial triaxial positioning values and the displacement of pupil obtained by the above operations to the determination model for gaze angle to determine the gaze angle.

Next, the method and steps of establishing the determination model for gaze angle will be described herein. The determination model for gaze angle can be established by the determination apparatus 1 itself. In some embodiments, the determination apparatus 1 may directly receive the determination model for gaze angle that has been trained from the outside device. In the present embodiment, the determination model for gaze angle is established by the determination apparatus 1 through the following steps. First, the processor 15 receives a plurality of sample images and a plurality of displacements of pupil corresponding to the sample images respectively. Then, the processor 15 analyzes each of the sample images to generate a plurality of facial triaxial positioning values corresponding to each of the sample images, and the technique for generating the facial triaxial positioning values is as described in the previous paragraph, and thus will not be further described herein. Finally, the processor 15 establishes the determination model for gaze angle through machine learning according to the displacements of pupil and the facial triaxial positioning values corresponding to each of the sample images.

Specifically, when establishing the determination model for gaze angle, in order to obtain the displacement of pupil corresponding to each sample image, the displacement of pupil may be measured by a measuring device for displacement of pupil (e.g., an eye tracker). In particular, one or more users may wear an eye tracker to perform their operation, and capture the image of the user's operation by the monitoring device or the camera device to simultaneously generate a plurality of sample images and obtain the displacement of pupil corresponding each sample image. Since the eye tracker can directly output the actual displacement of pupil of the user, the displacement of pupil corresponding to each sample image can be directly generated. Then, the processor 15 analyzes each of the sample images to generate a plurality of facial triaxial positioning values corresponding to each of the sample images. For example, the values of the yaw, the pitch, and the roll of the face in the image can be obtained by an angle analyzing kit (e.g., CV2 Solve PnP). Finally, the processor 15 can use the plurality of sample data generated by the foregoing method, and then establish a determination model for gaze angle through techniques such as machine learning. In the present embodiment, the two-dimensional sample images and the corresponding eye tracker can be used to establish the determination model for gaze angle, and through the machine learning model to improve the accuracy of the determination model for gaze angle. It should be noted that those skilled in the art should be able to understand the method of model training according to the above content, so further explanations are unnecessary. The method of model training shall be appreciated by those of ordinary skill in the art based on the above content, and thus will not be further described herein.

In some specific embodiments, the processor 15 may further determine a relative coordinate of gazing according to the gaze angle and a coordinate of a gaze target. In particular, the processor 15 can generate corresponding coordinates of gaze targets according to the environment of different applications. For example, different stores have different shelf sizes and shelf coordinates, each shelf can be set with an independent coordinate of a gaze target, and each shelf has a corresponding image capture device 13 to capture user images within a certain distance. The processor 15 analyses the image to estimate a depth value of the user in the image, and determines which item the user is looking at on the store shelf according to depth value, the calculated gaze angle, and the coordinate of the gaze target. For example, the control panel can also have a coordinate of the panel, a different panel size, and a plurality of buttons. The processor 15 can also analyze the depth value of the user, gaze angle, and the coordinate of the gaze target according to the image, and determine that the user is looking at which button on the control panel.

In some embodiments, the processor 15 further provides a piece of information corresponding to one of the goods or buttons to the user according to the goods or buttons that the user is looking at. Specifically, the processor 15 can provide a variety of related information, services, promotions, or assistance according to the relative coordinate of gazing (e.g., the related information about the control buttons that the factory operator is looking at and the related information about the products on the shelves that the customer is looking at).

In some embodiments, the present invention can not only analyze/refer to a single image, but also simultaneously determine the result of the gaze angle according to multiple images in the same time interval (e.g., the average value of the gaze angle), so as to more accurately determine the gaze angle of the user. The method of determining according to multiple images shall be appreciated by those of ordinary skill in the art based on the above content, and thus will not be further described herein.

According to the above descriptions, the determination apparatus 1 for gaze angle analyzes the facial features and the facial angle of the image, and then generates a plurality of facial triaxial positioning values and a plurality of face landmark points respectively. The determination apparatus 1 for gaze angle then generates an image compensation value by comparing the heatmap generated by the facial feature points with the standard heatmap, and generates the virtual corrected facial image based on the image and image compensation values. The determination apparatus 1 for gaze angle analyzes the virtual corrected facial image to obtain a displacement of pupil. The determination apparatus 1 for gaze angle inputs the facial triaxial positioning values and the displacement of pupil to the determination model for gaze angle, and determines the gaze angle of the user in the image. Through the aforesaid operations, the present invention can determine the gaze angle of the user through the image without the complicated pupil positioning, and effectively save the additional hardware installation cost, and solve the problems that may occur in the prior art. In addition, the present invention corrects the facial image before determining the gaze angle, so that it can be applied to various facial angle images of the user, and can be applied in fields such as shopping malls and factories, and more accurately determine the gaze angle of the user.

Figure 5:
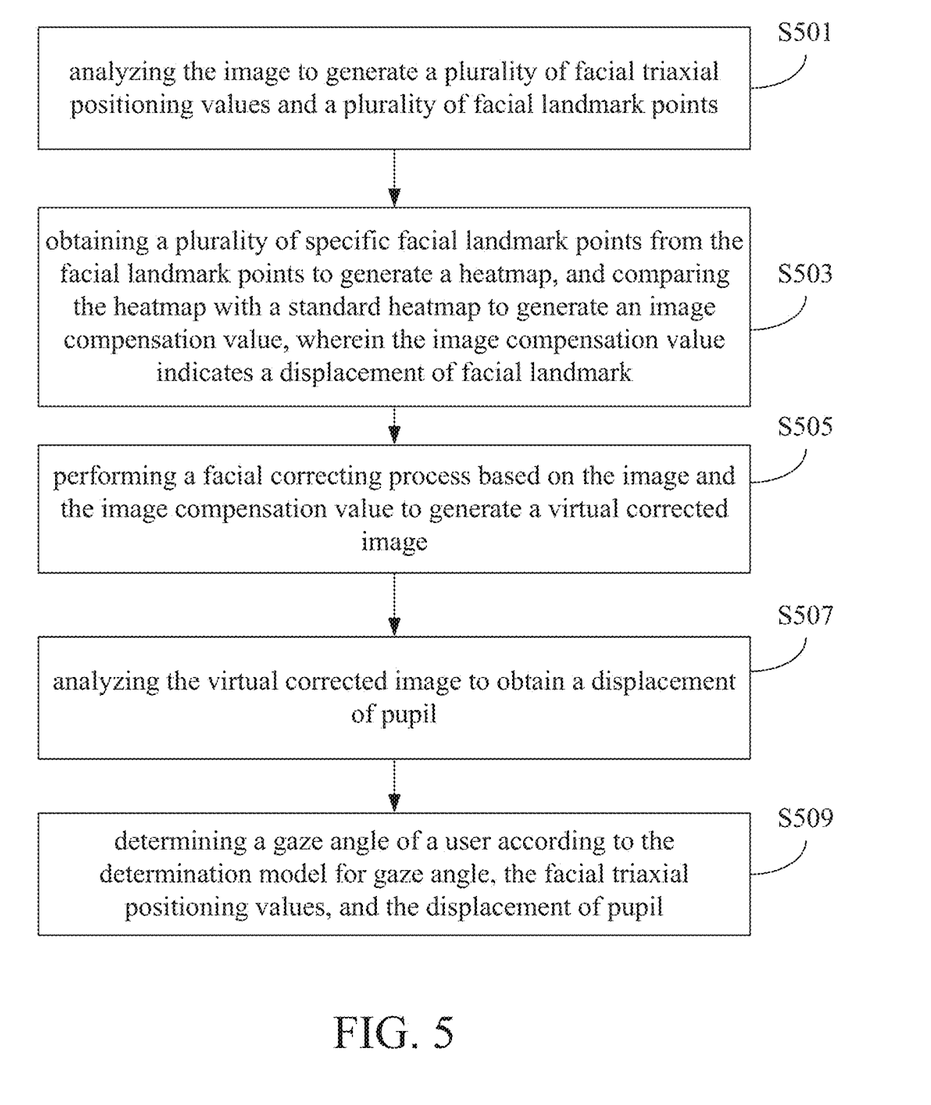
FIG. 5 illustrates a partial flowchart of the method of the second embodiment.

The flowchart diagram of a second embodiment of the present invention is depicted in FIG. 5. The determination method for gaze angle is adapted for an electronic apparatus (e.g., the determination apparatus 1 for gaze angle of the first embodiment). The electronic apparatus comprises a storage, an image capturing device, and a processor. The storage stores a determination model for gaze angle (e.g., the determination model for gaze angle of the first embodiment). The image capturing device is configured to capture an image. The determination method for gaze angle is executed by the processor. The determination method determines a gaze angle of a user via steps S501 to S509.

In step S501, the electronic apparatus analyzes the image to generate a plurality of facial triaxial positioning values and a plurality of facial landmark points. Next, in step S503, the electronic apparatus obtains a plurality of specific facial landmark points from the facial landmark points to generate a heatmap, and compares the heatmap with a standard heatmap to generate an image compensation value, and the image compensation value indicates a displacement of facial landmark. Thereafter, in step S505, the electronic apparatus performs a facial correcting process based on the image and the image compensation value to generate a virtual corrected image.

Next, in step S507, the electronic apparatus analyzes the virtual corrected image to obtain a displacement of pupil. Finally, in step S509, the electronic apparatus determines a gaze angle of a user according to the determination model for gaze angle, the facial triaxial positioning values, and the displacement of pupil.

In some embodiments, the facial triaxial positioning values include a yaw, a pitch, and a roll, and each of the yaw, the pitch, and the roll corresponds to a value.

In some embodiments, the facial landmark points are used to mark a plurality of facial feature positions, and the facial feature positions at least include feature positions of a corner of the left eye, a corner of the right eye, a nasal tip, a left end of the mouth, and a right end of the mouth, the heatmap is generated based on the facial feature positions, and the facial correcting process is performing a facial frontalization process In some embodiments, the facial correcting process further performs a couple-agent discriminator process after performing the facial frontalization process, the couple-agent discriminator process is used to enhance simulation accuracy of the virtual corrected image.

In some embodiments, the step of analyzing the virtual corrected image further comprises the following steps: analyzing the virtual corrected image to generate a plurality of facial landmark points; selecting a plurality of eye contour feature points according to the facial landmark points, and extracting a pupil feature point from the eye contour feature points; obtaining the displacement of pupil based on the pupil feature point.

In some embodiments, the determination model for gaze angle is established by the following steps: receiving a plurality of sample images and a plurality of displacements of pupil corresponding to the sample images respectively; analyzing each of the sample images to generate a plurality of facial triaxial positioning values corresponding to each of the sample images; establishing the determination model for gaze angle through machine learning according to the displacements of pupil and the facial triaxial positioning values corresponding to each of the sample images.

In some embodiments, when establishing the determination model for gaze angle, in order to obtain the displacement of pupil corresponding to each sample image, the displacement of pupil may be measured by a measuring device for displacement of pupil (e.g., an eye tracker).

In some embodiments, the determination method for gaze angle further determines a relative coordinate of gazing according to the gaze angle and a coordinate of a gaze target.

In some embodiments, the determination method for gaze angle further determines one of the objects corresponding to the relative coordinate of gazing, and provides a piece of information corresponding to the object to the user.

In addition to the aforesaid steps, the second embodiment can also execute all the operations and steps of, have the same functions, and deliver the same technical effects as determination apparatus 1 for gaze angle of the first embodiment. The ways of how the second embodiment executes these operations and steps, has the same functions, and delivers the same technical effects will be readily appreciated by those of ordinary skill in the art based on the explanation of the first embodiment, and thus will not be further described herein.

It shall be appreciated that, in the specification and the claims of the present invention, some words (including: facial triaxial positioning values, facial landmark points, and the displacement of pupil) are preceded by a term "first" or "second", and these terms "first" and "second" are only used to distinguish different words from each other.

According to the above descriptions, the determination technology for gaze angle (including at least the apparatus and method) provided by the present invention analyzes the facial features and the facial angle of the image, and then generates a plurality of facial triaxial positioning values and a plurality of face landmark points respectively. The determination technology for gaze angle then generates an image compensation value by comparing the heatmap generated by the facial feature points with the standard heatmap, and generates the virtual corrected facial image based on the image and image compensation values. The determination technology for gaze angle analyzes the virtual corrected facial image to obtain a displacement of pupil. The determination technology for gaze angle inputs the facial triaxial positioning values and the displacement of pupil to the determination model for gaze angle, and determines the gaze angle of the user in the image. Through the aforesaid operations, the present invention can determine the gaze angle of the user through the image without the complicated pupil positioning, and effectively save the additional hardware installation cost, and solve the problems that may occur in the prior art. In addition, the present invention corrects the facial image before determining the gaze angle, so that it can be applied to various facial angle images of the user, and can be applied in fields such as shopping malls and factories, and more accurately determine the gaze angle of the user.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A determination apparatus for gaze angle, comprising:
a storage, storing a determination model for gaze angle;
an image capturing device, being configured to capture an image;
a processor, being electrically connected to the storage and the image capture device and configured to perform the following operations:
analyzing the image to generate a plurality of first facial triaxial positioning values and a plurality of first facial landmark points;
obtaining a plurality of specific facial landmark points from the first facial landmark points to generate a heatmap, and comparing the heatmap with a standard heatmap to generate an image compensation value, wherein the image compensation value indicates a displacement of facial landmark;
performing a facial correcting process based on the image and the image compensation value to generate a virtual corrected image;
analyzing the virtual corrected image to obtain a first displacement of pupil; and
determining a gaze angle of a user according to the determination model for gaze angle, the first facial triaxial positioning values, and the first displacement of pupil.

2. The determination apparatus for gaze angle of claim 1, wherein the first facial triaxial positioning values include a yaw, a pitch, and a roll, and each of the yaw, the pitch, and the roll corresponds to a value.

3. The determination apparatus for gaze angle of claim 1, wherein the first facial landmark points are used to mark a plurality of facial feature positions, and the facial feature positions at least include feature positions of a corner of the left eye, a corner of the right eye, a nasal tip, a left end of the mouth, and a right end of the mouth, the heatmap is generated based on the facial feature positions, and the facial correcting process is performing a facial frontalization process.

4. The determination apparatus for gaze angle of claim 3, wherein the facial correcting process further comprises the following operations:
performing a couple-agent discriminator process after performing the facial frontalization process, wherein the couple-agent discriminator process is used to enhance simulation accuracy of the virtual corrected image.

5. The determination apparatus for gaze angle of claim 1, wherein the operation of analyzing the virtual corrected image further comprises the following operations:
analyzing the virtual corrected image to generate a plurality of second facial landmark points;
selecting a plurality of eye contour feature points according to the second facial landmark points, and extracting a pupil feature point from the eye contour feature points; and
obtaining the first displacement of pupil based on the pupil feature point.

6. The determination apparatus for gaze angle of claim 1, wherein the determination model for gaze angle is established by the following steps:
receiving a plurality of sample images and a plurality of second displacements of pupil corresponding to the sample images respectively;
analyzing each of the sample images to generate a plurality of second facial triaxial positioning values corresponding to each of the sample images; and
establishing the determination model for gaze angle through machine learning according to the second displacements of pupil and the second facial triaxial positioning values corresponding to each of the sample images.

7. The determination apparatus for gaze angle of claim 6, wherein each of the second displacements of pupil corresponding to each of the sample images is a value measured by a measuring device for displacement of pupil when capturing each of the sample images.

8. The determination apparatus for gaze angle of claim 1, wherein the processor further determines a relative coordinate of gazing according to the gaze angle and a coordinate of a gaze target.

9. The determination apparatus for gaze angle of claim 8, wherein the processor further determines one of the objects corresponding to the relative coordinate of gazing, and provides a piece of information corresponding to the object to the user.

10. A determination method for gaze angle, being adapted for a determination apparatus for gaze angle, the determination apparatus comprising a storage, an image capturing device, and a processor, the storage storing a determination model for gaze angle, the image capturing device being configured to capture an image, and the determination method being performed by the processor and comprising:
analyzing the image to generate a plurality of first facial triaxial positioning values and a plurality of first facial landmark points;
obtaining a plurality of specific facial landmark points from the first facial landmark points to generate a heatmap, and comparing the heatmap with a standard heatmap to generate an image compensation value, wherein the image compensation value indicates a displacement of facial landmark;
performing a facial correcting process based on the image and the image compensation value to generate a virtual corrected image;
analyzing the virtual corrected image to obtain a first displacement of pupil; and
determining a gaze angle of a user according to the determination model for gaze angle, the first facial triaxial positioning values, and the first displacement of pupil.

11. The determination method for gaze angle of claim 10, wherein the first facial triaxial positioning values include a yaw, a pitch, and a roll, and each of the yaw, the pitch, and the roll corresponds to a value.

12. The determination method for gaze angle of claim 10, wherein the first facial landmark points are used to mark a plurality of facial feature positions, and the facial feature positions at least include feature positions of a corner of the left eye, a corner of the right eye, a nasal tip, a left end of the mouth, and a right end of the mouth, the heatmap is generated based on the facial feature positions, and the facial correcting process is performing a facial frontalization process.

13. The determination method for gaze angle of claim 12, wherein the facial correcting process further comprises:
performing a couple-agent discriminator process after performing the facial frontalization process, wherein the couple-agent discriminator process is used to enhance simulation accuracy of the virtual corrected image.

14. The determination method for gaze angle of claim 10, wherein the step of analyzing the virtual corrected image further comprises:
- analyzing the virtual corrected image to generate a plurality of second facial landmark points;
- selecting a plurality of eye contour feature points according to the second facial landmark points, and extracting a pupil feature point from the eye contour feature points; and
- obtaining the first displacement of pupil based on the pupil feature point.

15. The determination for gaze angle method of claim 10, wherein the determination model for gaze angle is established by the steps comprising:
- receiving a plurality of sample images and a plurality of second displacements of pupil corresponding to the sample images respectively;
- analyzing each of the sample images to generate a plurality of second facial triaxial positioning values corresponding to each of the sample images; and
- establishing the determination model for gaze angle through machine learning according to the second displacements of pupil and the second facial triaxial positioning values corresponding to each of the sample images.

16. The determination method for gaze angle of claim 15, wherein each of the second displacements of pupil corresponding to each of the sample images is a value measured by a measuring device for displacement of pupil when capturing each of the sample images.

17. The determination method for gaze angle of claim 10, wherein the determination method further comprises:
- determining a relative coordinate of gazing according to the gaze angle and a coordinate of a gaze target.

18. The determination method for gaze angle of claim 17, wherein the determination method further comprises:
- determining one of the objects corresponding to the relative coordinate of gazing, and provides a piece of information corresponding to the object to the user.

\* \* \* \* \*